(12) United States Patent
Larsen

(10) Patent No.: US 6,785,510 B2
(45) Date of Patent: Aug. 31, 2004

(54) ROUTING IN A MULTI-STATION NETWORK

(75) Inventor: James David Larsen, Pretoria (ZA)

(73) Assignee: Salbu Resarch & Development (Proprietary) Limited, Pretoria (ZA)

(*) Notice: Subject to any disclaimer, the term of this patent is extended or adjusted under 35 U.S.C. 154(b) by 443 days.

(21) Appl. No.: 09/730,096

(22) Filed: Dec. 5, 2000

(65) Prior Publication Data

US 2001/0036810 A1 Nov. 1, 2001

(30) Foreign Application Priority Data

Mar. 9, 2000 (WO) .............................. PCT/IB00/00248

(51) Int. Cl.[7] .............................................. H04B 7/15
(52) U.S. Cl. ...................... 455/11.1; 455/13.1; 455/502
(58) Field of Search .............................. 455/11.1, 517, 455/522, 502, 13.1, 13.2, 500; 370/338, 465

(56) References Cited

U.S. PATENT DOCUMENTS

| | | | | |
|---|---|---|---|---|
| 5,481,539 | A | * 1/1996 | Hershey et al. | 370/312 |
| 5,615,215 | A | * 3/1997 | Utting et al. | 370/337 |
| 5,689,802 | A | * 11/1997 | Luzzatto | 455/11.1 |
| 6,407,991 | B1 | * 6/2002 | Meier | 370/338 |
| 6,501,955 | B1 | * 12/2002 | Durrant et al. | 455/456.1 |

FOREIGN PATENT DOCUMENTS

| | | | |
|---|---|---|---|
| EP | 0689303 | 12/1995 | |
| EP | 0 689 303 A1 | * 12/1995 | ............ H04B/7/26 |
| WO | WO9707603 | 2/1997 | |
| WO | WO9856140 | 12/1998 | |

* cited by examiner

Primary Examiner—Nick Corsard
Assistant Examiner—Tan Trinh
(74) Attorney, Agent, or Firm—Ladas & Parry

(57) ABSTRACT

A method of relaying data between mobile stations in a cellular communications system is provided. The system comprises a number of mobile stations and base stations. Each base station makes synchronization transmissions within its area of covers, which define a broadcast control channel for the transmission of broadcast data from the base station to mobile stations within the area of coverage. The synchronization transmissions are received at mobile stations within the area of coverage, which extracts data defining the broadcast control channel, and at least one calling channel on which mobile stations can transmit probe data to one another. The probe data is used by the mobile stations to obtain connectivity information relating to the availability of other mobile stations. The synchronization transmissions also contain data which is used to define at least one traffic channel which is used by the mobile stations to relay message data between themselves. Effectively, the method of the invention provides a hybrid system which combines conventional cellular technology with opportunistic relaying technology.

6 Claims, 14 Drawing Sheets

Figure 6A:
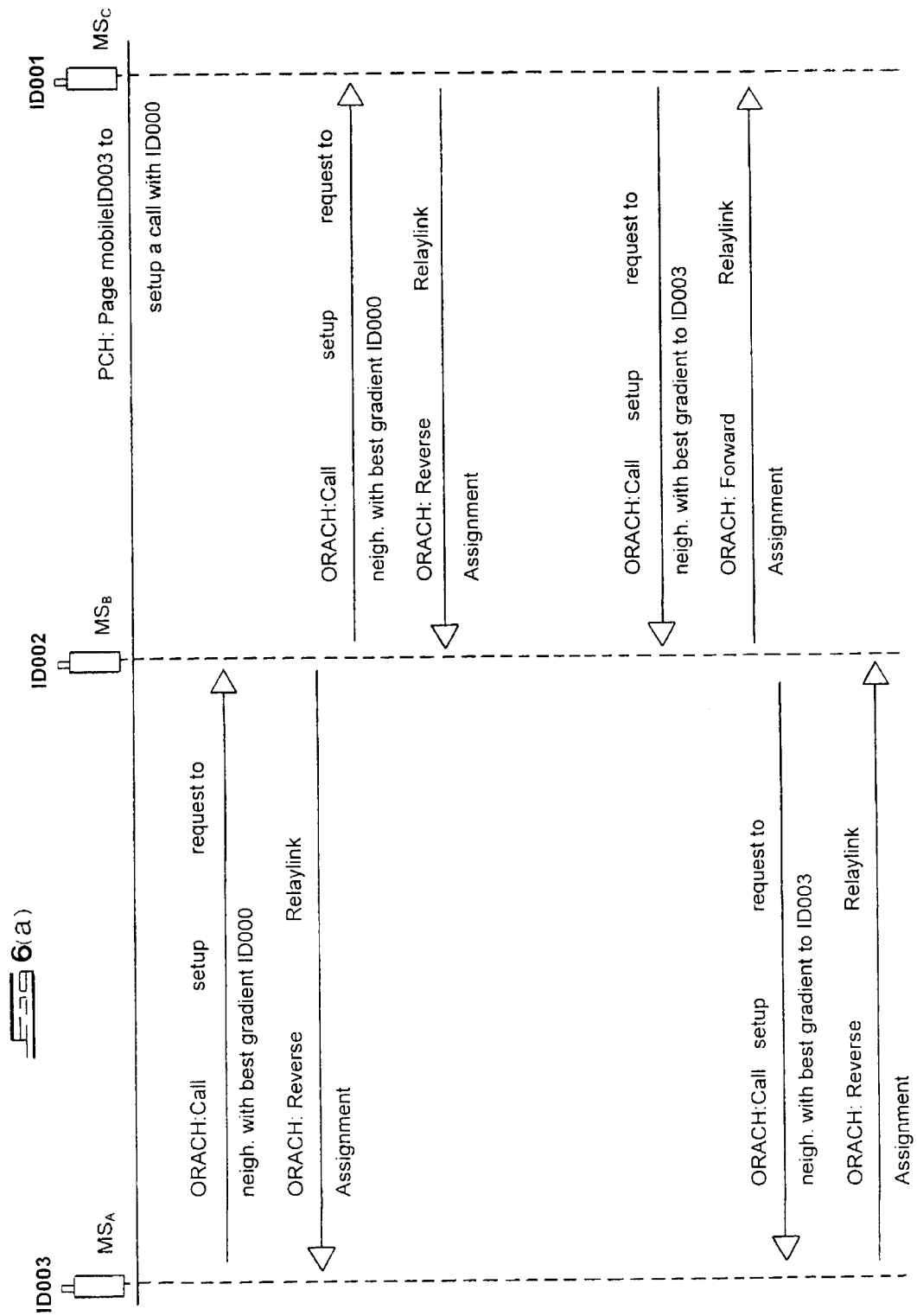

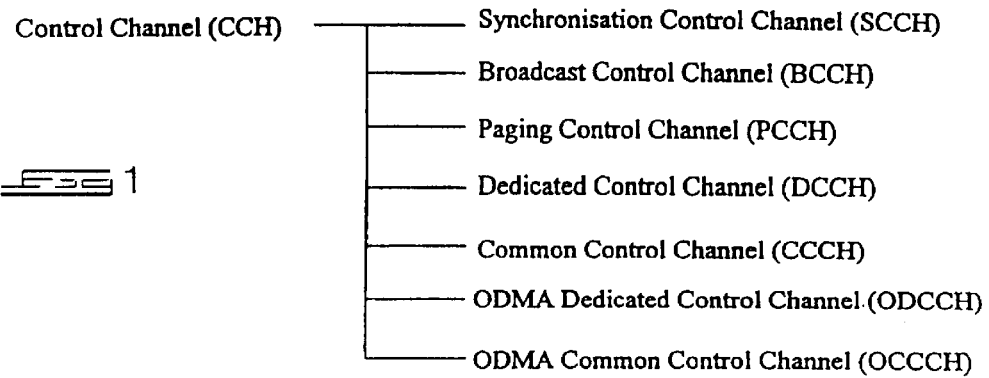
Fig. 1
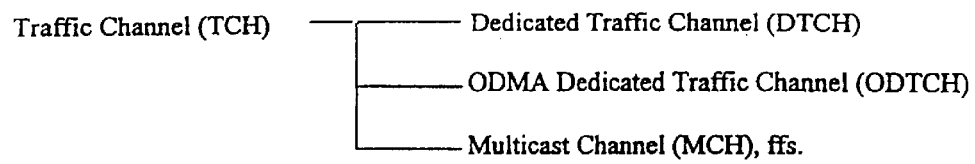
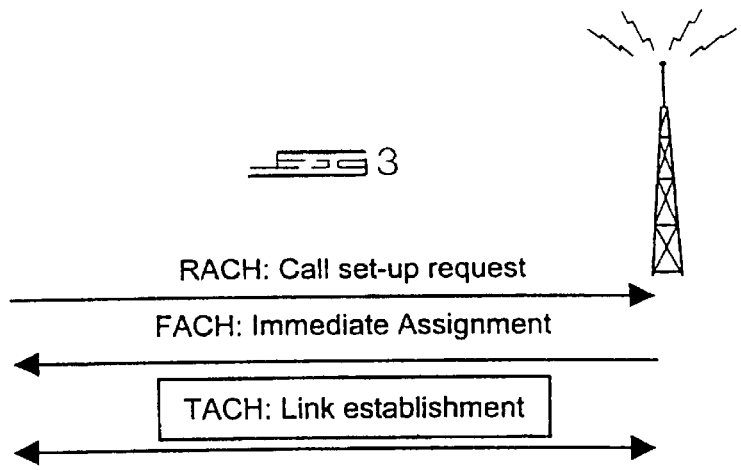
Fig. 3
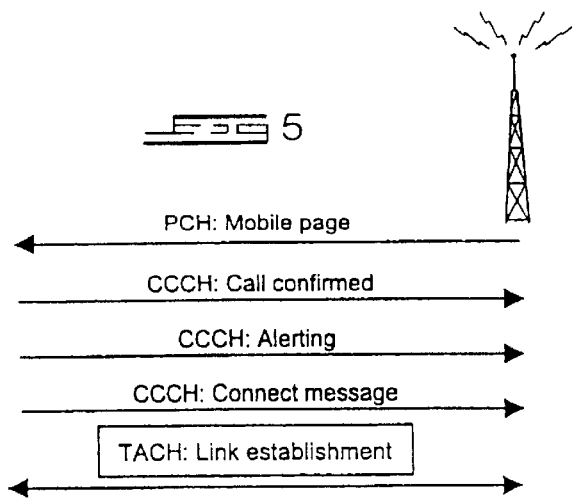
Fig. 5

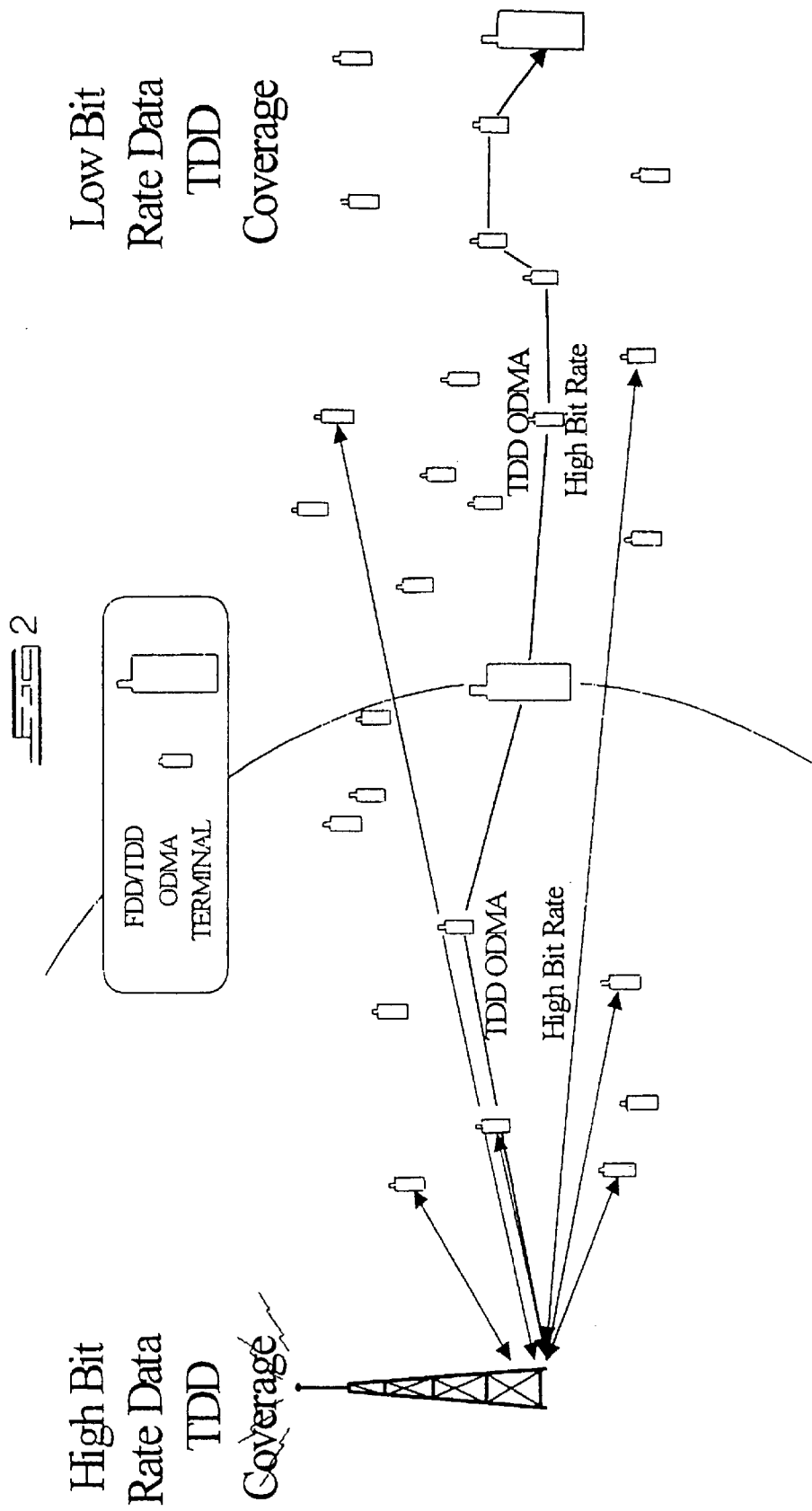

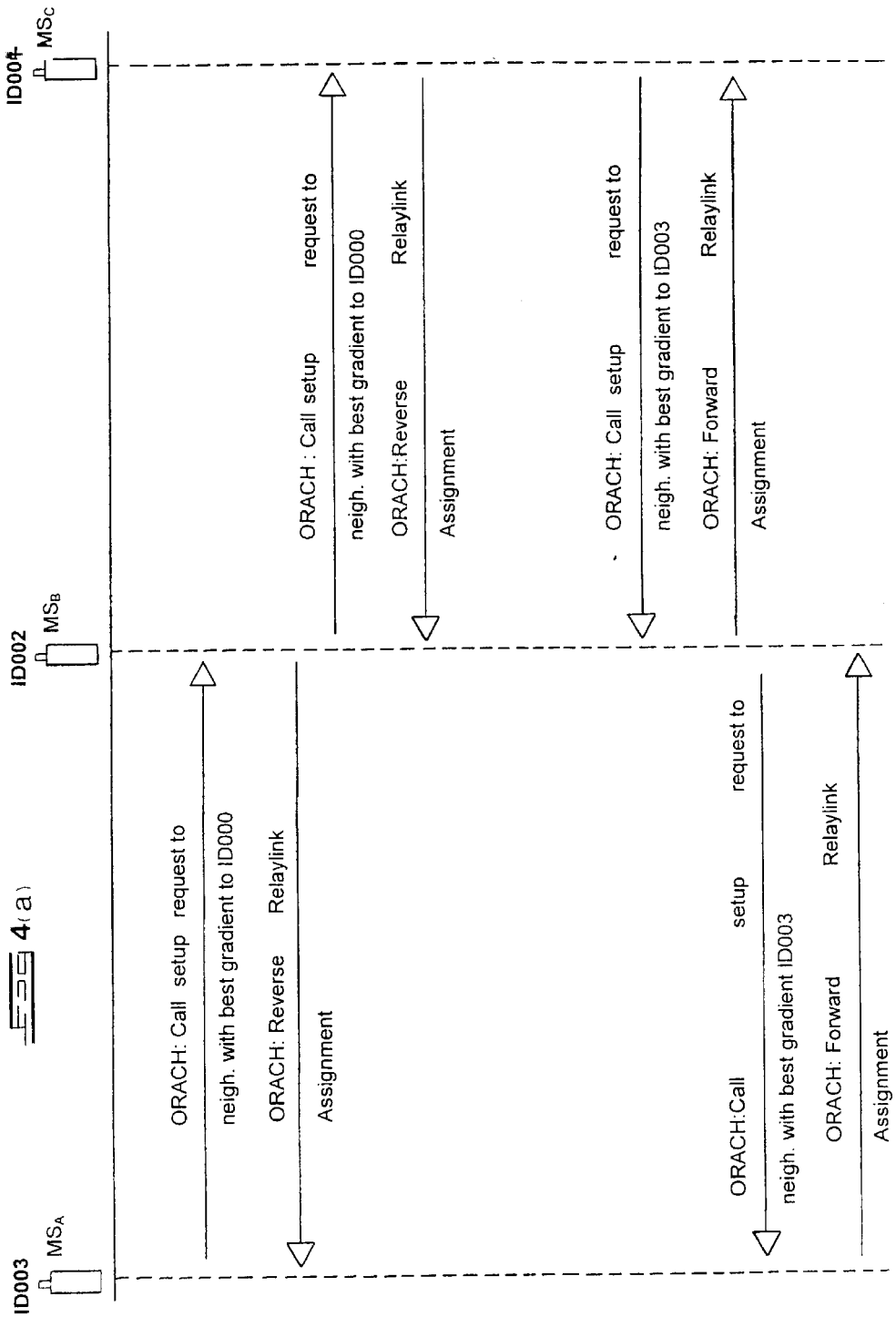

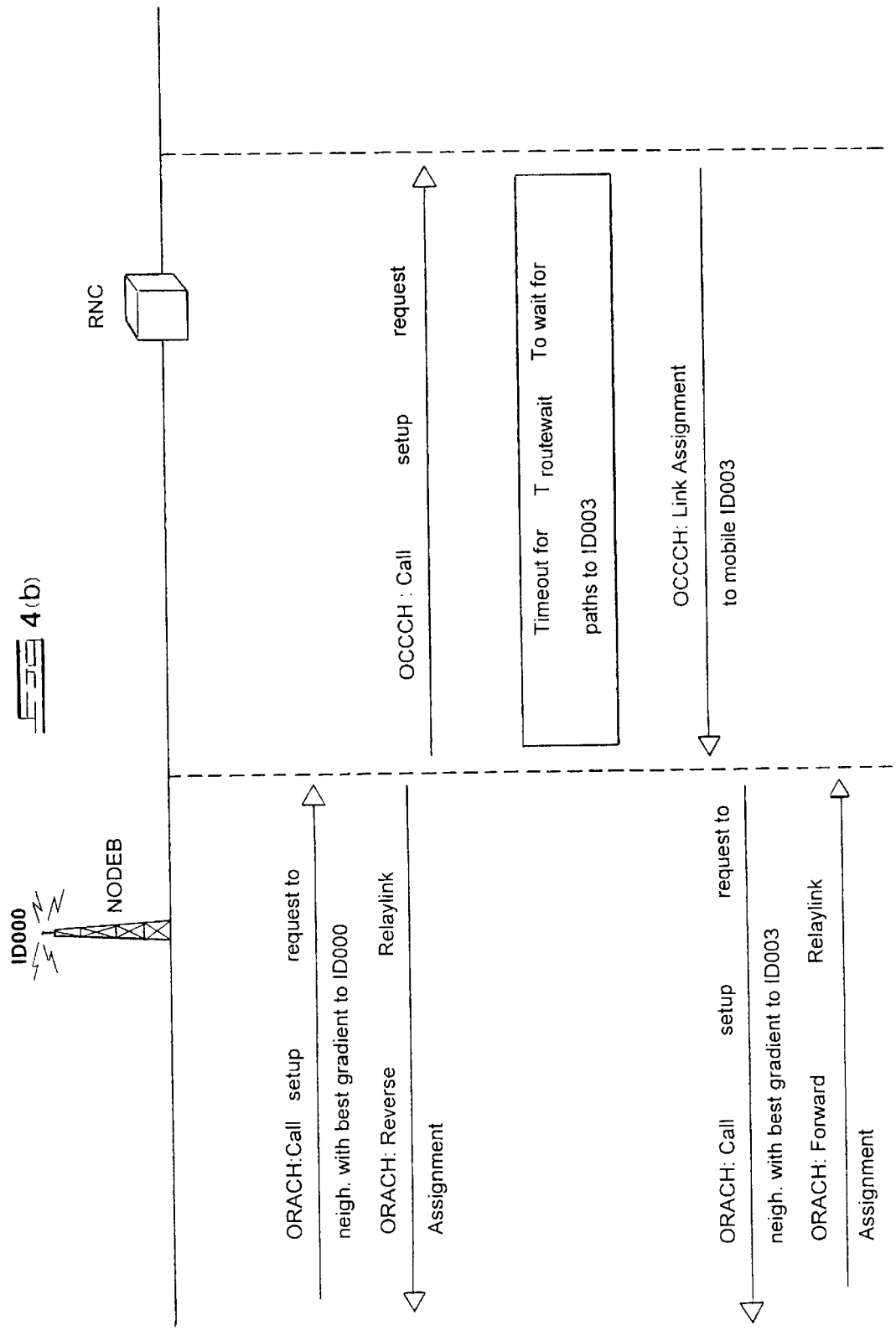

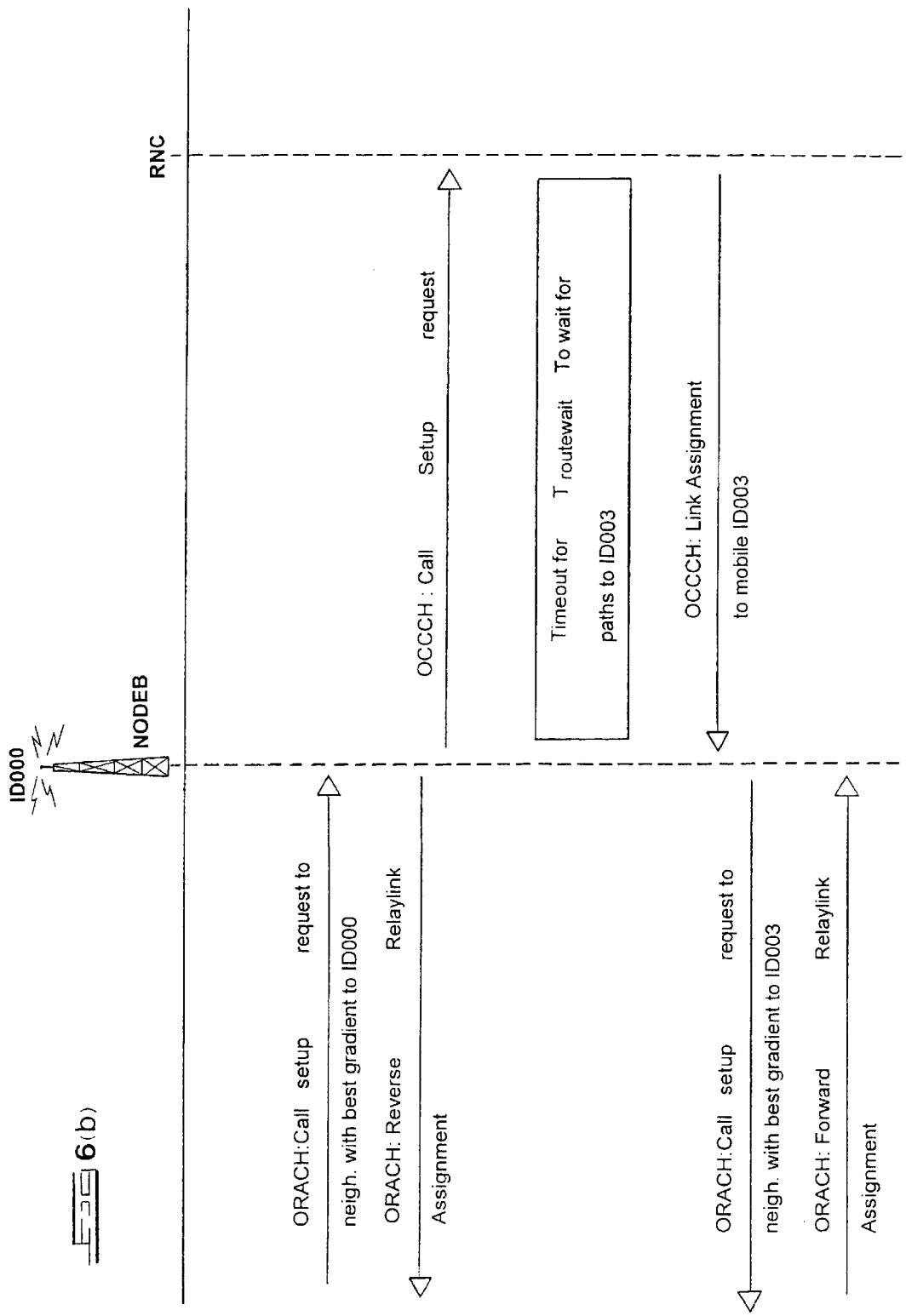

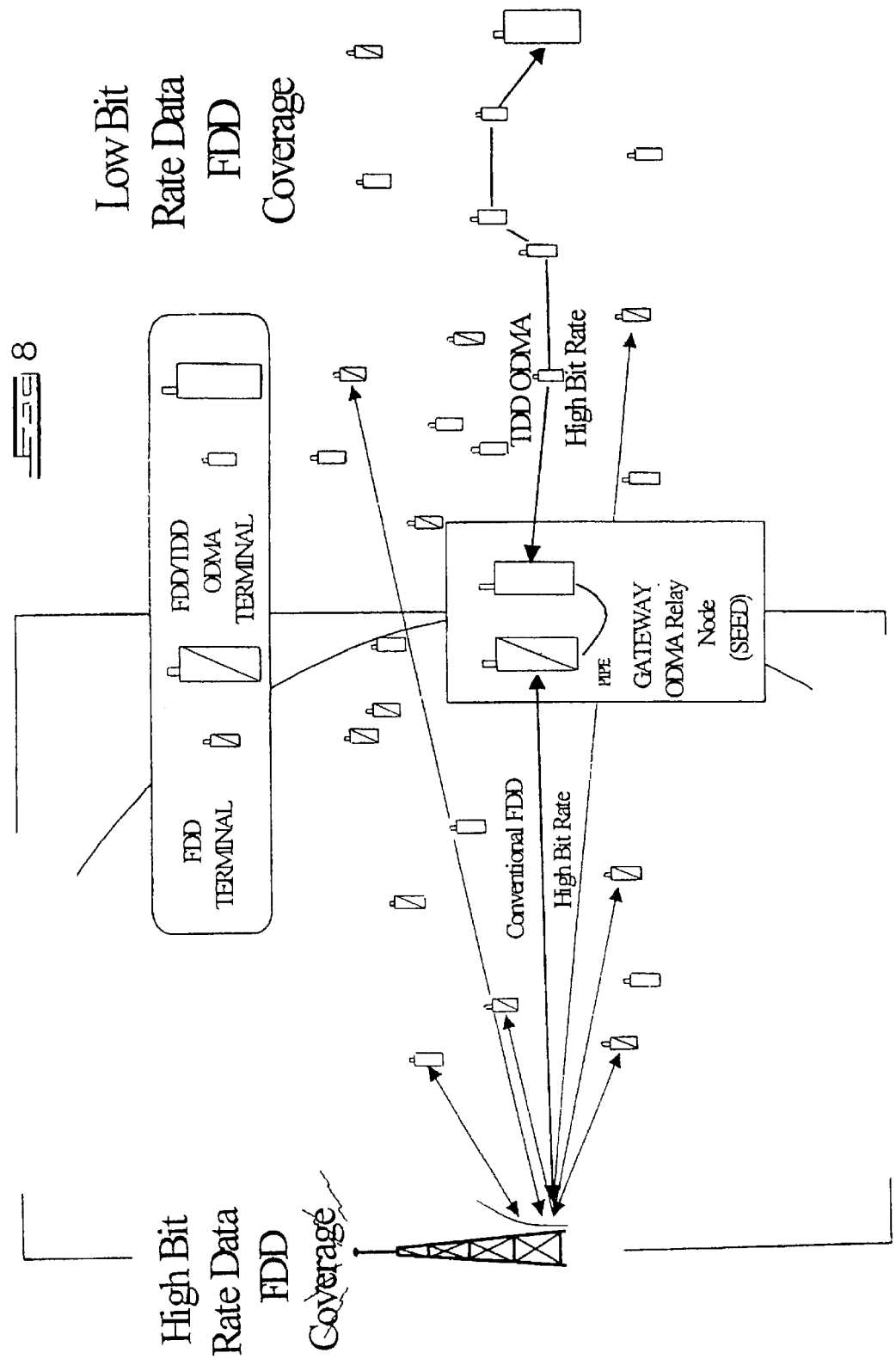

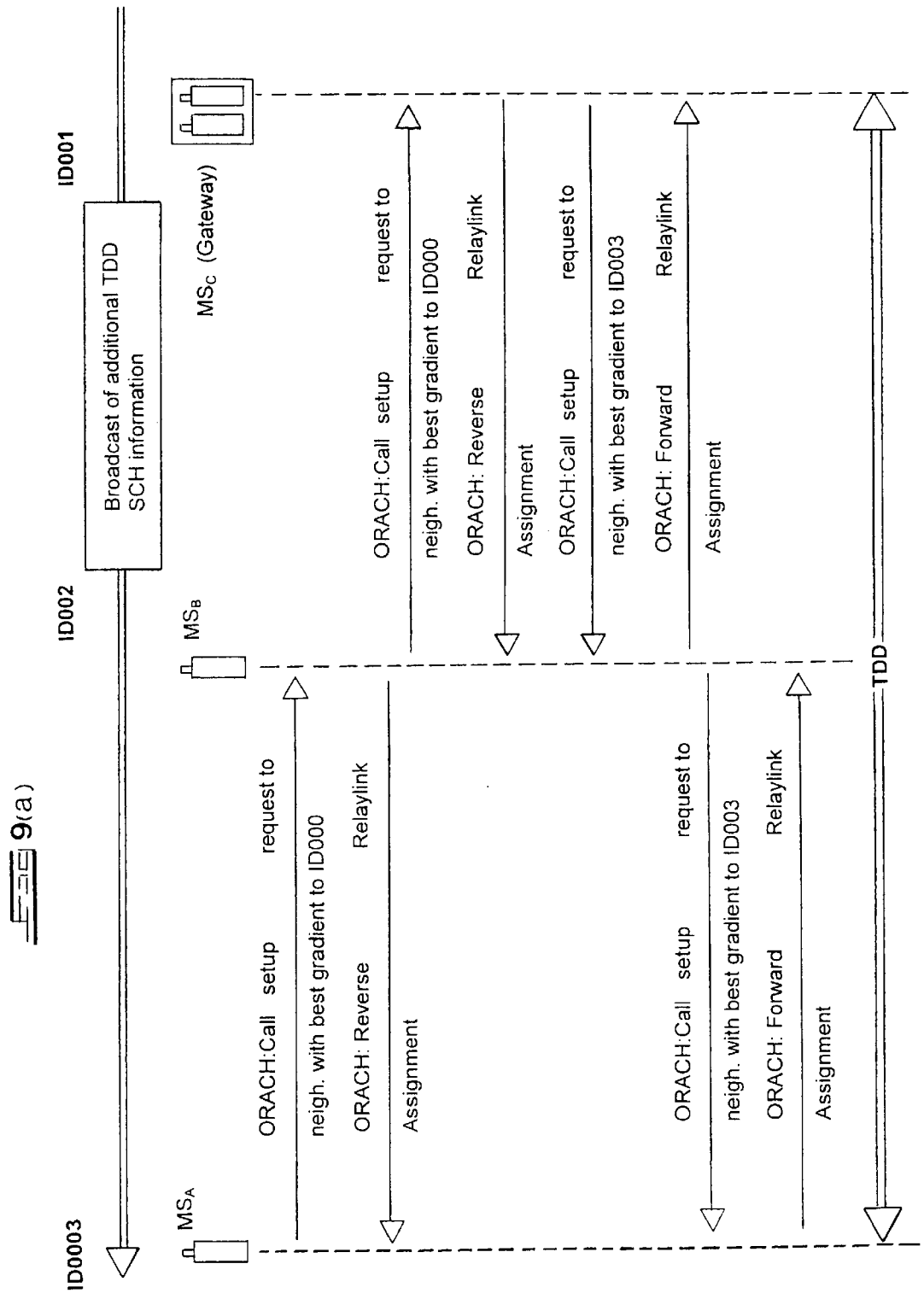

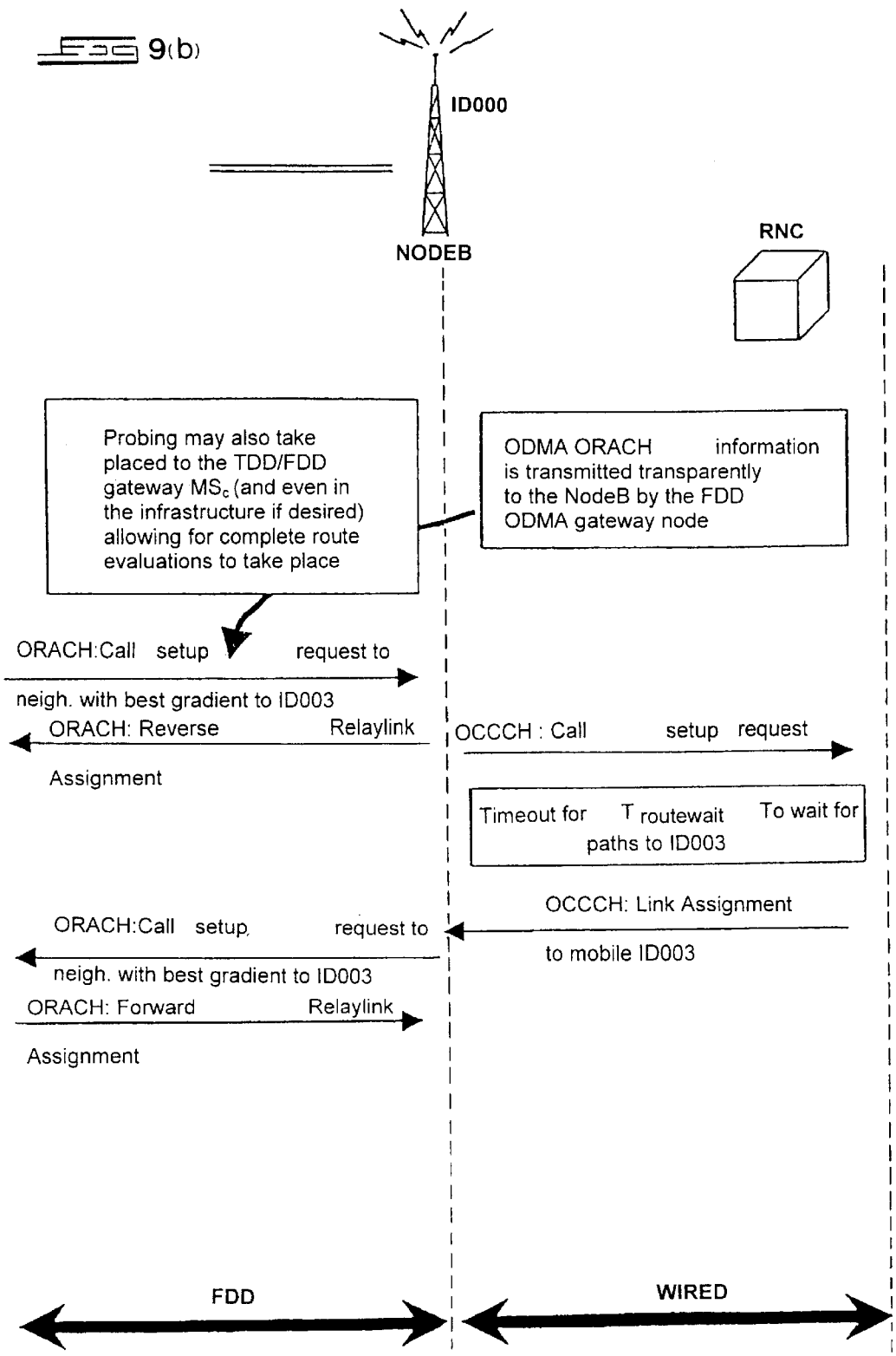

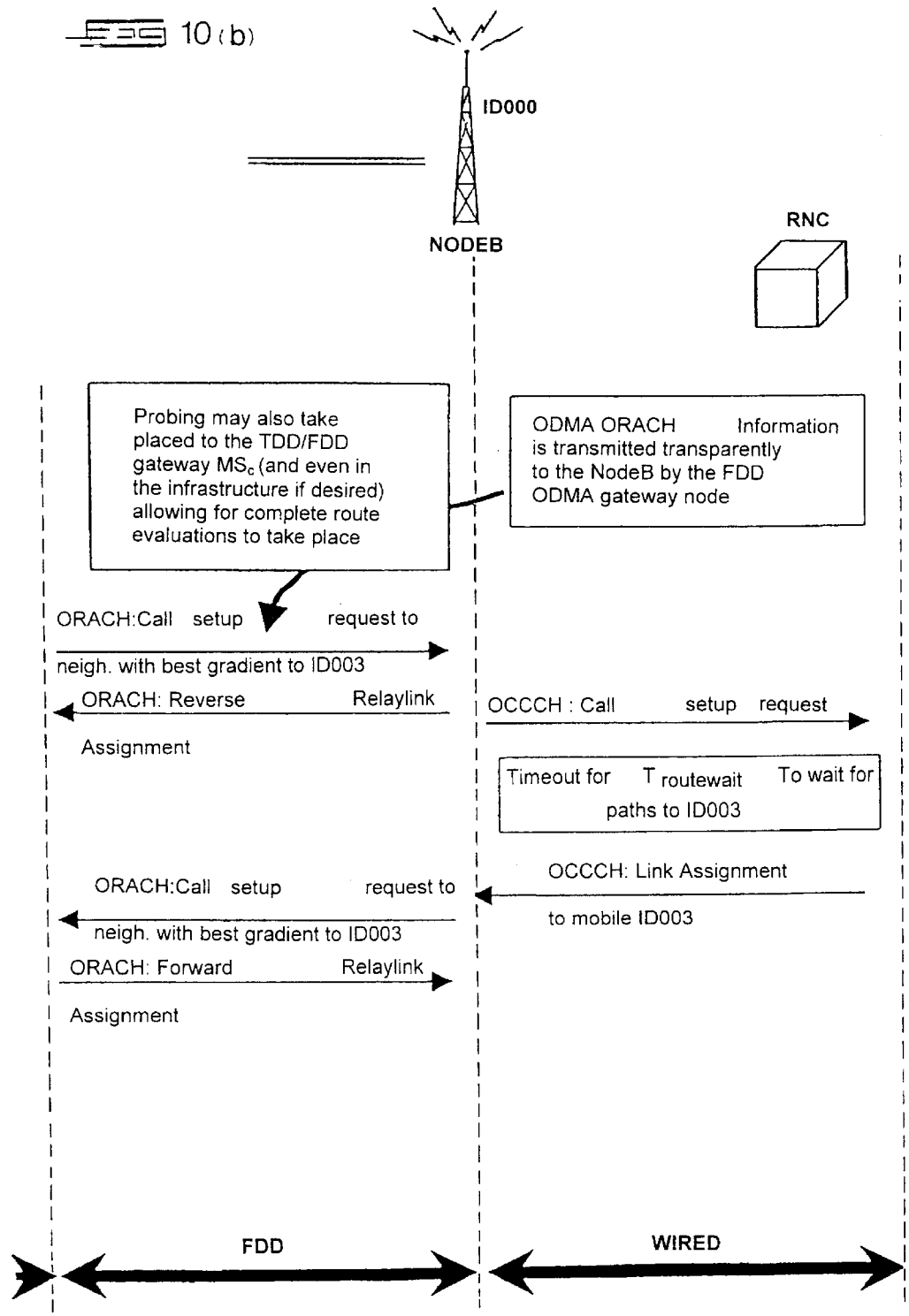

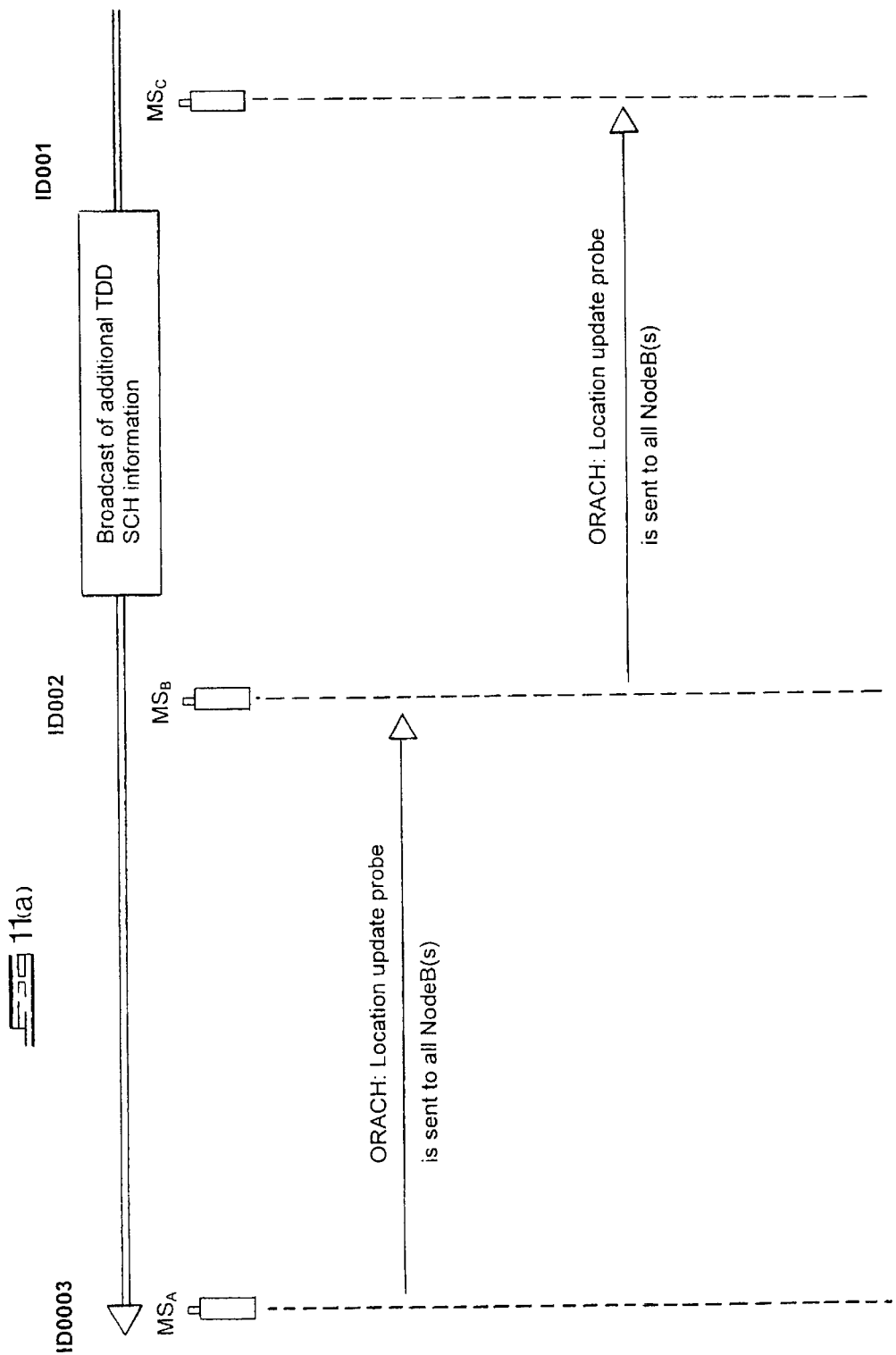

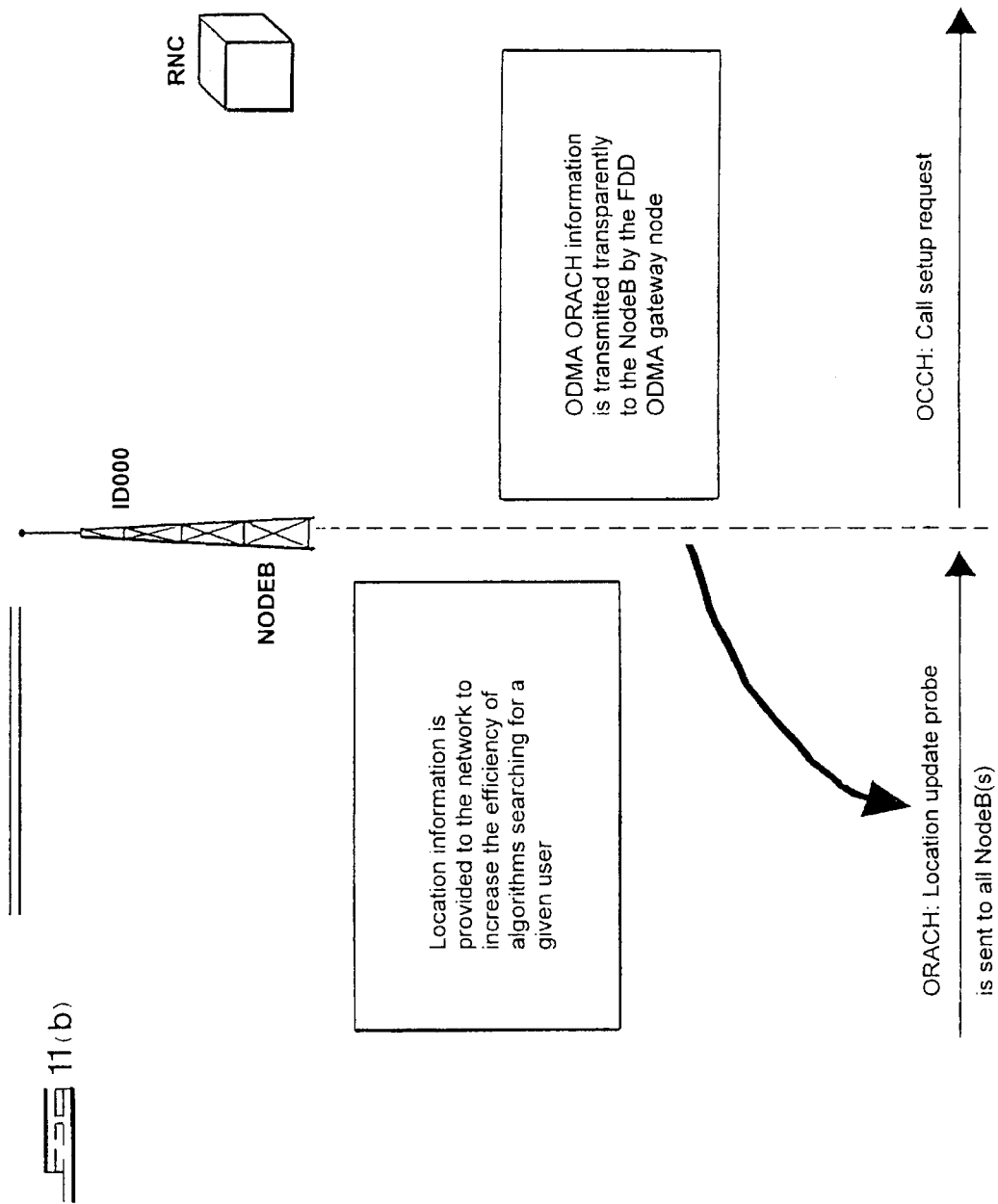

ROUTING IN A MULTI-STATION NETWORK

BACKGROUND TO THE INVENTION

THIS invention relates to a method of routing transmissions within a multi-station network, typically between mobile stations in a cellular network utilising ad hoc or opportunistic message routing.

Such cellular systems consist of two primary families, namely Time Division Duplex (TDD) and Frequency Division Duplex (FDD) systems or hybrids of these two methods of duplexing. In the TDD system, base stations and mobiles achieve duplex or two-way communication through transmitting and receiving in sequential time slots, whereas in FDD duplexing is achieved by transmitting and receiving in different frequency bands.

In an ideal telecommunications system the minimum amount of transmit power would be used to cover a given path. In wireless telecommunications systems serving a large number of subscribers, an opportunistic method of transmission can be utilised, wherein information is relayed between a number of stations or nodes from an originating station to a destination station. An example of such a method is described in International patent application no. WO 96/19887 the contents of which are incorporated herein by reference.

In a system of the above kind, it has been shown that the most efficient method of communicating is to break a larger path down into a number of smaller hops, rather than to use a single relatively high powered hop. However, the efficient routing of data in such a system without incurring a large processing overhead is not trivial.

It is an object of the invention to address this issue.

SUMMARY OF THE INVENTION

According to the invention there is provided a method of relaying data between mobile stations in a cellular wireless communication system which comprises a plurality of mobile stations and a plurality of base stations, the method comprising the making of synchronisation transmissions from each base station within an area of coverage of the base stations, the synchronisation transmissions defining a broadcast control channel for the transmission of broadcast data from the base station to mobile stations within the area of coverage; receiving the synchronisation transmissions at mobile stations within the area of coverage and extracting data therefrom defining the broadcast control channel, and at least one calling channel on which mobile stations can transmit probe data to one another, the probe data being used by mobile stations to obtain connectivity information relating to the availability of other mobile stations.

The broadcast data transmitted from the base station to the mobile stations may contain information identifying the base station and information relating to available capacity at the base station.

The mobile stations may utilise the calling channel to broadcast probe signals to other mobile stations, the probe signals from each mobile station including information on the transmission power, local background noise level and path loss to other stations.

Preferably, mobile stations receiving probe signals from other mobile stations on the calling channel utilise the information therein to generate connectivity data relating to the other mobile stations.

The synchronisation transmissions preferably define at least one traffic channel usable by mobile stations to relay message data between themselves.

The synchronisation transmissions from the base stations are preferably made at relatively high power and a relatively low data rate, and message data transmitted between mobile stations on the traffic channel is transmitted at a relatively low power and a relatively high data rate.

In the method of the invention, high power, lower data rate transmissions are made by base stations which have wide area coverage and these transmissions are used for broadcasting synchronisation and other information directly to mobile stations within the cell (the area of coverage of the base station). The mobile stations operate at relatively low power and therefore need to relay message data from mobile station to mobile station to support high speed data services back to the base station from an originating mobile station within the cell. Relaying message data via mobile stations is also used to provide a high speed data service from the base station to a mobile station within the cell to effectively extend these services to the cell perimeter.

When mobile stations receive the synchronisation transmissions and broadcast data, they utilise this information to locate a specific time slot and frequency or "calling channel" (also referred to as a random access channel or ORACH) usable by mobile stations to interact with one another.

The mobile stations transmit so-called broadcast probe messages on the calling channel which contain several parameters, such as transmission power, local background noise level and path loss data. This information allows a mobile station receiving a broadcast probe message from a neighbouring mobile station to derive a local connectivity indicator for that neighbour. Each mobile station maintains a list of local connectivity indicators for each neighbouring station. This neighbour list is included in broadcast probe messages sent out by each mobile station, so that on receiving a broadcast probe message including a neighbour list, a mobile station can derive local connectivity information for other mobile stations up to two hops away.

Mobile stations also include gradient information in their probe messages. The gradient information represents the cumulative cost of transmitting data via a number of relay links to a particular destination station. A cost function is used to calculate the gradient for a particular destination. This function will depend on a number of parameters such as the cumulative power required to reach a designated destination station, resource utilisation on relay links, the number of relays required, etc. Each mobile station will update the gradient associated with a particular destination station every time it receives a probe message from a neighbour containing the destination station's identity data. As it is not practical for each mobile station to process and retain gradient information to every other mobile station, mobile stations use the synchronisation and broadcast transmissions from the base stations to identify which base station coverage area they are in, and develop gradients to those base stations. This significantly reduces the number of destinations that gradients are developed for, as normally a given mobile station will only be covered by one or a few base stations.

The synchronisation and broadcast information received from the base stations is used to define time slots and frequencies that can be used by mobile stations to transfer message data between themselves in relay mode. These time slots and frequencies are referred to as dedicated traffic channels (ODTCH).

The synchronisation of channels and resources is used by mobile stations according to the method of the invention to set up relay links to the base station more effectively.

DESCRIPTION OF AN EMBODIMENT

The method of the invention is primarily aimed at utilising so-called ODMA (opportunity division multiple access) techniques in a cellular wireless communication system in order to enhance the performance of such a system. The system is thus a hybrid between a conventional cellular system in which mobile stations communicate directly to a base station within a cell, and a full ODMA system in which there is not necessarily any base station and mobile stations communicate with each other by relaying messages amongst themselves.

The basic call process of the present invention can be summarised as follows:

If a mobile station $MS_A$ wishes to initiate a call to a base station:

1. The initiating mobile station $MS_A$ initially sends notification on the calling channel (ORACH) to its neighbors informing them to start developing gradients back to it. All stations in the area of coverage of the same base stations as $MS_A$ (established by monitoring the synchronization and broadcast transmissions from the base stations) then start developing routing gradients to $MS_A$ to be used by the base stations to find routes to $MS_A$.

2. The initiating mobile station $MS_A$ sends a call set-up probe message on the calling channel (ORACH) to one of its neighbours $MS_B$ after consulting its gradient table to determine the best route to the base station it is covered by. The call set-up probe contains details of the required bearer Quality of Signal (QoS) (Type of service such as Internet and message delay requirement) and throughput by the mobile for the call. This will determine how much resource will be reserved by the neighbor for the call.

3. The neighbour station $MS_B$ responds on the calling channel (ORACH) with an acknowledgement probe message containing the details of which Opportunity Driven Traffic Channel (ODTCH) channels may be used for the connection between $MS_B$ and $MS_A$. If an ODTCH is available the ODTCH is used for all further call maintenance communications.

4. The same procedure is executed between $MS_B$ and one of its selected neighbours $MS_C$, and then from $MS_C$ to its best neighbour. The gradients are followed from station to station until the base station is reached, and the call set-up information is passed on to the base station.

5. The call set-up information (request information) is passed on by the base station to the RRC (Radio Resource Controller), which negotiates with the core network providing authentication of the mobile station $MS_A$ for security and billing purposes and setting up of network resources. If the call is allowed by the network the relay link from the mobile to the network is effectively established.

6. The base station then needs to establish a relay link back to the mobile station $MS_A$. Since the mobile station $MS_A$ initially sends notification on the calling channel (ORACH) to its neighbors informing them to start developing gradients back to it the base station waits for a timeout $T_{routewait}$ for these gradients to reach it. After the timeout $T_{routewait}$ the base station NodeB's gradient table is examined for a suitable connect to the ODMA mobile station $MS_A$. If the base station NodeB finds that mobile station $MS_C$ is its best neighbour for communication with mobile station $MS_A$ it will then begin a forward-relaylink bearer establishment procedure with $MS_C$.

7. The same procedure is carried forward between $MS_C$-$MS_B$ and $MS_B$ to $MS_A$.

8. Once the forward-relaylink from the base station to $MS_A$ has been assigned the ODMA route has been established allowing data and further network system information to be exchanged.

9. Once the call is over the $MS_A$ removes from its probes the requirement for other mobile stations to develop gradients to it.

If the network wishes to initiate a call to a mobile station $MS_A$:

1. Mobile stations monitor the synchronization and broadcast transmissions of base stations. When a mobile station detects that it has moved from the coverage of one base station to another it sends a location update to the base station. This can be done as a direct transmission to the base station or as a short message sent via relay. The location information is sent by the base station that receives it to a central mobile location data base that is used by the network to keep track of which base stations a mobile is covered by.

2. When the network wishes to initiate a call to a mobile station, the network consults a central mobile station location data base and decides which base stations the mobile is covered by. The network controller then tells these base stations to page the mobile.

3. Mobile stations monitor broadcast information from the base station. If a mobile station hears a page signal it will respond by initiating a call to the base station that it received the probe from. The mobile then informs its neighbors to start developing gradients back to it and initiates a call with the base station as described above in the mobile initiated call procedure.

4. After sending a page and optionally receiving a response message directly or via relay, the base stations wait for a time-out $T_{waitroute}$ to allow sufficient time for routes to be gathered back from the paged mobile to the themselves.

5. The rest of the procedure is then identical to that used for a mobile initiated call.

Note that the procedure is almost identical to the mobile station originated case except that the call set-up procedure is invoked using a paging message from the network.

In this document, the following abbreviations and terminology are used:

| | |
|---|---|
| ARQ | Automatic Repeat Request |
| BCCH | Broadcast Control Channel |
| BCH | Broadcast Channel |
| C | Control- |
| CC | Call Control |
| CCCH | Common Control Channel |
| CCH | Control Channel |
| CCTrCH | Coded Composite Transport Channel |
| CN | Core Network |
| CRC | Cyclic Redundancy Check |
| DC | Dedicated Control (SAP) |
| DCA | Dynamic Channel Allocation |
| DCCH | Dedicated Control Channel |
| DCH | Dedicated Channel |
| DL | Downlink |
| DRNC | Drift Radio Network Controller |
| DSCH | Downlink Shared Channel |

-continued

| | |
|---|---|
| DTCH | Dedicated Traffic Channel |
| FACH | Forward Link Access Channel |
| FAUSCH | Fast Uplink Signalling Channel |
| FCS | Frame Check Sequence |
| FDD | Frequency Division Duplex |
| GC | General Control (SAP) |
| HO | Handover |
| ITU | International Telecommunication Union |
| kbps | kilo-bits per second |
| L1 | Layer 1 (physical layer) |
| L2 | Layer 2 (data link layer) |
| L3 | Layer 3 (network layer) |
| LAC | Link Access Control |
| LAI | Location Area Identity |
| MAC | Medium Access Control |
| MM | Mobility Management |
| Nt | Notification (SAP) |
| OCCCH | ODMA Common Control Channel |
| ODCCH | ODMA Dedicated Control Channel |
| ODCH | ODMA Dedicated Channel |
| ODMA | Opportunity Driven Multiple Access |
| ORACH | ODMA Random Access Channel |
| ODTCH | ODMA Dedicated Traffic Channel |
| PCCH | Paging Control Channel |
| PCH | Paging Channel |
| PDU | Protocol Data Unit |
| PHY | Physical layer |
| PhyCH | Physical Channels |
| RACH | Random Access Channel |
| RLC | Radio Link Control |
| RNC | Radio Network Controller |
| RNS | Radio Network Subsystem |
| RNTI | Radio Network Temporary Identity |
| RRC | Radio Resource Control |
| SAP | Service Access Point |
| SCCH | Synchronization Control Channel |
| SCH | Synchronization Channel |
| SDU | Service Data Unit |
| SRNC | Serving Radio Network Controller |
| SRNS | Serving Radio Network Subsystem |
| TCH | Traffic Channel |
| TDD | Time Division Duplex |
| TFCI | Transport Format Combination Indicator |
| TFI | Transport Format Indicator |
| TMSI | Temporary Mobile Subscriber Identity |
| TPC | Transmit Power Control |
| U- | User- |
| UE | User Equipment |
| $UE_R$ | User Equipment with ODMA relay operation enabled |
| UL | Uplink |
| UMTS | Universal Mobile Station Telecommunications System |
| URA | UTRAN Registration Area |
| UTRA | UMTS Terrestrial Radio Access |
| UTRAN | UMTS Terrestrial Radio Access Network |

Transport Channels

A general classification of transport channels is into two groups:

common channels (where there is a need for inband identification of the UEs when particular UEs are addressed) and dedicated channels (where the UEs are identified by the physical channel, i.e. code and frequency for FDD and code, time slot and frequency for TDD).

Common transport channel types are:

Random Access Channel (RACH)

A contention based uplink channel used for transmission of relatively small amount of data, e.g. for initial access or non-realtime dedicated control or traffic data.

ODMA Random Access Channel (ORACH)

A contention based channel used in relaylink.

Forward Access Channel (FACH)

Common downlink channel without closed-loop power control used for transmission of relatively small amount of data.

Downlink Shared Channel (DSCH)

A downlink channel shared by several UEs carrying dedicated control or traffic data.

Broadcast Channel (BCH)

A downlink channel used for broadcast of system information into an entire cell.

Synchronization Channel (SCH)

A downlink channel used for broadcast of synchronization information into an entire cell in TDD mode.

Note that the SCH transport channel is defined for the TDD mode only. In the FDD mode, a synchronization channel is defined as a physical channel. This channel however should not be confused with the SCH transport channel defined above.

Paging Channel (PCH)

A downlink channel used for broadcast of control information into an entire cell allowing efficient UE sleep mode procedures. Currently identified information types are paging and notification. Another use could be UTRAN notification of change of BCCH information.

Dedicated transport channel types are:

Dedicated Channel (DCH)

A channel dedicated to one UE used in uplink or downlink.

Fast Uplink Signalling Channel (FAUSCH)

An uplink channel used to allocate dedicated channels in conjunction with FACH.

ODMA Dedicated Channel (ODCH)

A channel dedicated to one UE used in relaylink.

Logical Channels

The MAC layer provides data transfer services on logical channels. A set of logical channel types is defined for different kinds of data transfer services as offered by MAC. Each logical channel type is defined by what type of information is transferred.

A general classification of logical channels is into two groups:

Control Channels (for the transfer of control plane information)

Traffic Channels (for the transfer of user plane information)

The configuration of logical channel types is depicted in FIG. 1.

Control Channels

Control channels are used for transfer of control plane information only.

Synchronisation Control Channel (SCCH)

A downlink channel for broadcasting synchronisation information (cell ID, optional information) in case of TDD operation.

Broadcast Control Channel (BCCH)

A downlink channel for broadcasting system control information.

Paging Control Channel (PCCH)

A downlink channel that transfers paging information. This channel is used when the network does not know the location cell of the UE nor, the UE is in the cell connected state (utilizing UE sleep mode procedures).

Common Control Channel (CCCH)

Bi-directional channel for transmitting control information between network and UEs. This channel is commonly used by the UEs having no RRC connection with the network.

Dedicated Control Channel (DCCH)

A point-to-point bi-directional channel that transmits dedicated control information between a UE and the network. This channel is established through RRC connection setup procedure.

ODMA Common Control Channel (OCCCH)

Bi-directional channel for transmitting control information between UEs.

ODMA Dedicated Control Channel (ODCCH)

A point-to-point bi-directional channel that transmits dedicated control information between UEs. This channel is established through RRC connection setup procedure.

Traffic Channels

Traffic channels are used for the transfer of user plane information only.

Dedicated Traffic Channel (DTCH)

A Dedicated Traffic Channel (DTCH) is a point-to-point channel, dedicated to one UE, for the transfer of user information. A DTCH can exist in both uplink and downlink.

ODMA Dedicated Traffic Channel (ODTCH)

A ODMA Dedicated Traffic Channel (ODTCH) is a point-to-point channel, dedicated to one UE, for the transfer of user information between UE's. A ODTCH exists in relaylink.

1. Random Access Channel(s) (RACH) characterized by:
    existence in uplink only,
    limited data field. The exact number of allowed bits is FFS.
    collision risk,
    open loop power control,
    requirement for in-band identification of the UEs.

2. ODMA Random Access Channel(s) (ORACH) characterized by:
    used in TDD mode only (FDD is for FFS)
    existence in relay-link
    collision risk,
    open loop power control,
    no timing advance control
    requirement for in-band identification of the UE.

3. Forward Access Channel(s) (FACH) characterized by:
    existence in downlink only,
    possibility to use beam forming,
    possibility to use slow power control,
    possibility to change rate fast (each 10 ms),
    lack of fast power control and
    requirement for in-band identification of UEs.

4. Broadcast Channel (BCH) characterized by:
    existence in downlink only,
    low fixed bit rate and
    requirement to be broadcast in the entire coverage area of the cell.

5. Paging Channel (PCH) characterized by:
    existence in downlink only,
    possibility for sleep mode procedures and
    requirement to be broadcast in the entire coverage area of the cell.

6. Synchronisation channel (SCH) characterized by:
    existence in TDD and downlink only
    low fixed bit rate
    requirement to be broadcast in the entire coverage area of the cell 7. Downlink Shared Channel(s) (DSCH) characterised by:
    existence in downlink only,
    possibility to use beamforming,
    possibility to use slow power control,
    possibility to use fast power control, when associated with dedicated channel(s)
    possibility to be broadcast in the entire cell
    possibility for implicit identification of destination UE based on signalling on another channel (DCH or DSCH Control Channel).

8. DSCH Control Channel characterised by:
    existence in downlink only,
    possibility to use beam forming,
    possibility to use slow power control,
    lack of fast power control and
    requirement for in-band identification of UEs.

Gateway $UE_R$/Seed

A ODMA relay node that also communicates with the UTRAN using either TDD or FDD mode.

ODMA Relay Node

A relay device, such as a $UE_R$ or Seed, that is capable of relaying using the ODMA protocol.

Relay

A device capable of receiving and transmitting information for another user.

Relaying

The process of receiving and transmitting information for another user, such as carried out by a $UE_R$.

Relaylink

Relaylink is the communications line between two ODMA relay nodes.

Root Relay

ODMA relay node where communications are either sourced or sunk.

Seed

A ODMA relay node which is deployed by a network operator and is generally fixed, constantly powered, and has no display/keypad.

User Equipment Relay ($UE_R$)

A UE capable of relay operation and which may source and sink information.

An aim of the present invention is to provide a method and system wherein Mobile Originated (MO) and Mobile Terminated (MT) routing takes place in both a standard Time Division Duplex (TDD) system and in a TDD/FDD (Frequency Division Duplex) system.

Thus, according to the present invention, a method of integrating the relaying techniques between mobiles and base stations using TDD and FDD is provided. This invention makes use of opportunistic ad hoc routing techniques, as described in South African patent no. 95/10789, and uses the concept of power adaption described in South African patent no. 98/6882, and routeing techniques as described in South African patent no. 98/4891. The contents of these patents are incorporated herein by reference.

Effectively, the present invention involves a hybridisation of the systems disclosed in the above patents in order to enhance or implement the methodology described in South African patent no. 98/1835, the contents of which are incorporated herein by reference. This patent document, a cellular structure whereby base stations have regions of reduced available resources between them and rely on relaying by mobile stations in order to provide resources to these regions, thereby enhancing capacity and improving performance.

In order for mobile stations (mobiles) in the network to derive routes or methods of relaying information or data to and from the base stations, they probe and adapt their power and transmissions to gather a certain number of neighbours. This probing is done on an adaptive basis where the power level and the rate of probing and the interval between probing is set based upon the feedback from the other stations as described in South African patent no. 98/4891.

In this patent methods of generating gradients are also described, which consists of handing information from neighbour to neighbour as to the amount of power or quality of path to various destinations in the network. In this patent a technique is extended to a cellular structure where the base station, referred to as node "B", is the primary route for which gradients must be found. This vastly simplifies routing, since providing mobiles are routing the majority of their information to and from the base stations, all a mobile has to do is generate gradients to the base station or node "B". This is a simplified method to that described in patent no. 98/4891. In that application there was full mesh routing between any node to any node on a multi-hop basis. Therefore, in the context of a cellular environment, mobiles only need to probe and gather gradients to base stations in their normal idle environment. During this idle probing process, sufficient neighbours are gathered to allow at least one gradient to be found to the base station, preferably more, to allow redundant routing to be possible.

The present invention has particular application in an Opportunity Driven Multiple Access (ODMA) system. In such a system, "neighbour gathering" is used to effect the routeing process within the network. Neighbour gathering is a process whereby the local connectivity of an ODMA relay node is assessed through the use of background probing messages. This neighbour information is stored within a neighbour table. Gradient tables are also derived from the neighbour messages but are used to evaluate the end-to-end connectivity. Gradients are effectively a cost function of the routeing messages over a particular path in terms of propagation conditions, number of hops, and other system parameters. In practice each mobile station should have at least one gradient to a NodeB which will allow any call set-up procedures to be executed allowing for route acquisition.

The simplest method of implementation of opportunity driven multiple access into a conventional cell phone infrastructure, would be to have the base stations perform the same functions as the mobiles, whereby they probe and gather neighbours and follow the same mechanisms as the mobiles, thereby allowing simple methods of routing to be used in that the base station node would appear to be the same as any other node in the network with the one provision that it would be routed to or gradients would be gathered to it from every other node within the region of the cell. In order to allow this, the base stations would need to operate in time division duplex to allow probing to be performed and monitoring of the same channel in the same way as the mobiles do. This method of using a calling channel is described more fully in South African patent no. 98/4891.

If the base station operates in time division duplex mode, then the features of paging whereby the base station can transmit and call any particular mobile to initiate transmission of traffic, as described in South African patent no. 98/1835. In addition, the base station can allow transmissions which can synchronise the various remotes to allow them to define time slots and intervals of transmission, thereby allowing more effective synchronisation of their local clocks and more efficient use of the resources. The base station broadcasts this time synchronisation information on, for example the calling channel or a dedicated broadcast channel, which is monitored by all the remotes in the network or in the region of the particular base station. This allows the mobiles or remotes to identify which base station they are being covered by and to synchronise themselves with respect to that base station and to each other. As shown in FIG. 1, the region of coverage of the base station broadcasts and low data rate coverage will cover the complete cell, while the region of higher resources covers only part of the cell using the methodology described in South African patent no. 98/1835.

One implementation of ODMA would be to use a TDD system that has all of the ODMA probing mechanisms and procedures built into the TDD infrastructure. This implementation results in system information such as synchronisation and paging messages being readily available from the standard TDD system. The mobile station originated and terminated ODMA call set-up procedures and the location update procedure are described below.

One of the aims of ODMA is to extend the range of the data coverage, e.g. to match that offered by TDD and FDD for speech coverage. A simplistic view of this concept is illustrated in FIG. 2.

The example shown in FIG. 2 illustrates the concept of how extended data service coverage may be provided using ODMA with and integrated TDD/ODMA infrastructure in 3G TDD. The figure illustrates a scenario where the background system may provide extended data coverage directly through the use of ODMA.

Below, a mobile originated call is described. This consists of a situation where a typical subscriber wishes to initiate a call or originate a call, for example by dialing a number or calling up a particular address in the fixed network. This requires a connection to be set up with the base station and through the base station with the fixed infrastructure to a particular destination. This consists essentially of a two step procedure, where a random access channel (RACH) call request is made to the base station, as shown in FIG. 3. After which, once resource is being allocated in terms of capacity at the base station, a response is sent back using the VAFACH or access grant channel.

The process whereby this can be relayed from the mobile to the base station and into the network is shown in FIG. 4(a) and FIG. 4(b), where ID 3 is the originator which then consults its routing table in terms of finding the best gradient to the base station and having identified ID 2, it sends an ORACH message or transmission to ID 2, which duly responds acknowledging receipt and then forwards it through to ID 1, which has the best gradient from it to the base station. Likewise ID 1 sends a message to the base station, at which stage the base station sends a message to the RNC, or Radio Network Controller, which then assigns a channel to the base station for the particular request, thus effectively reserving resources in the fixed infrastructure. The base station then sends the information back via multiple relay hop to the mobile which made the request, giving a forward and reverse link assignment. In this process, ID 2 and ID 1 may set aside relaying resources which they themselves reserve temporarily for ID 3, as does the base station and the network controller. Alternatively, since relays are used opportunely, other IDs apart from ID and ID 2 may be used to relay data to and from ID 3 to the base station.

The mobile station originated call set-up procedure in 3G will consist of a number of procedures with one such procedure being the Radio Resource Control.

In this description the call set-up procedures will be simplified to ease the description of basic ODMA call procedures (see FIG. 3).

The call set-up procedure is shown to consist of three basic operations. The first is a call set-up request which is made on the RACH (Random Access Channel) resulting in an immediate assignment message which is received on the FACH (Forward Access Control Channel). The immediate assignment message contains details of which TCH (Traffic Channel) and SACCH (Slow Associated Control Channel) is to be used for the radio link. However, in an ODMA relay system a call set-up will have to negotiate with each mobile station that is used to determine a route.

Before any call set-up procedure is executed all ODMA mobile stations will have executed a probing mechanism to gather neighbours. Once they have carried out sufficient probing they will be able to transmit messages to a NodeB. Thus a typical call set-up procedure is illustrated in FIG. 4(a) and FIG. 4(b). Note that in a pure TDD system the paging messages and synchronization information may easily be obtained from the core TDD infrastructure.

The core set-up procedure illustrated in FIG. 4(a) and FIG. 4(b) is described concisely below:

10. $MS_A$ decides to make a call to another mobile station somewhere within the network which results in a MO call set-up request.
11. $MS_A$ sends a call set-up probe to $MS_B$ after consulting its gradient table to determine the best route to the NodeB. The call set-up probe contains details of the required bearer Quality of Signal (QoS) and throughput.
12. $MS_B$ responds with an acknowledgement probe containing the details of which Opportunity Driven Traffic Channel (ODTCH) channels may be used for the connection. If an ODTCH is available the ODTCH is used for all further call maintenance communications.
13. The same procedure is executed between $MS_B$–$MS_C$, and $MS_C$-NodeB.
14. The call set-up primitives are passed on the RRC (Radio Resource Controller), which negotiates with the core network providing authentication etc. If the call is allowed the forward-relaylink is required to be established.
15. After a timeout $T_{routewait}$ the NodeB's gradient table is examined for a suitable connect to the ODMA node $MS_A$. The NodeB finds that mobile station $MS_C$ is its best neighbour for communication with ODMA node $MS_A$ and will begin a forward-relaylink bearer establishment procedure with $MS_C$.
16. The same procedure is carried forward between $MS_C$-$MS_B$ and $MS_B$ to $MS_A$.
17. Once the forward-relaylink to $MS_A$ has been assigned the ODMA route has been established allowing data and further network system information to be exchanged.

The above procedure described a mobile originated call set-up procedure. Below, a mobile terminated call set-up procedure is described, in which a user in the fixed infrastructure wishes to contact or originate a call to a mobile user.

In the mobile station terminated call set-up case a process such as the simplified example shown in FIG. 5 will occur.

In most telecommunications systems the paging of any mobile stations is governed by ramping up of paging messages over three expanding location areas. These location areas are last known cell, last location area, and finally the entire network with a global page. In ODMA the gradients to all users are not always processed and retained as this would result in every ODMA node keeping a global routing table of gradients to every other mobile station with the network, which is not practical. Thus, to overcome this routeing problem in the mobile station terminated call set-up procedure the mobile station is initially paged to allow forward-relaylink routes to be calculated to the destination mobile station. A time-out $T_{waitroute}$ is used to allow sufficient time for routes to be gathered back to the source NodeB. Using this mechanism the call set-up procedure will follow the procedure described below with reference to FIG. 6(a) and FIG. 6(b).

Note that the procedure is almost identical to the mobile station originated case except that the call set-up procedure is invoked using a paging message from the network.

1. ID003 is paged requesting it to set up a call with the NodeB using a MO call set-up request.
2. $MS_A$ sends a call set-up probe to $MS_B$ after consulting its gradient table to determine the best route to the NodeB. The call set-up probe contains details of the required bearer QoS and throughput.
3. MSB responds with an acknowledgement probe containing the details of which ODTCH channels may be used for the connection. If an ODTCH is available the ODTCH is used for all further call maintenance communications.
4. The same procedure is executed between $MS_B$–$MS_C$, and $MS_C$-NodeB.
5. The call set-up primitives are passed on the RRC, which negotiates with the core network providing authentication etc. If the call is allowed the forward-relaylink is required to be established.
6. After a timeout $T_{routewait}$ the NodeB's gradient table is examined for a suitable connect to the ODMA node $MS_A$. The NodeB finds that mobile station $MS_C$ is its best neighbour for communication with ODMA node $MS_A$ and will begin a forward-relaylink bearer establishment procedure with $MS_C$.
7. The same procedure is carried forward between $MS_C$-$MS_B$ and $MS_B$ to $MS_A$.

Once the forward-relaylink to $MS_A$ has been assigned the ODMA route has been established allowing data and further network system information to be exchanged.

Figure 7:
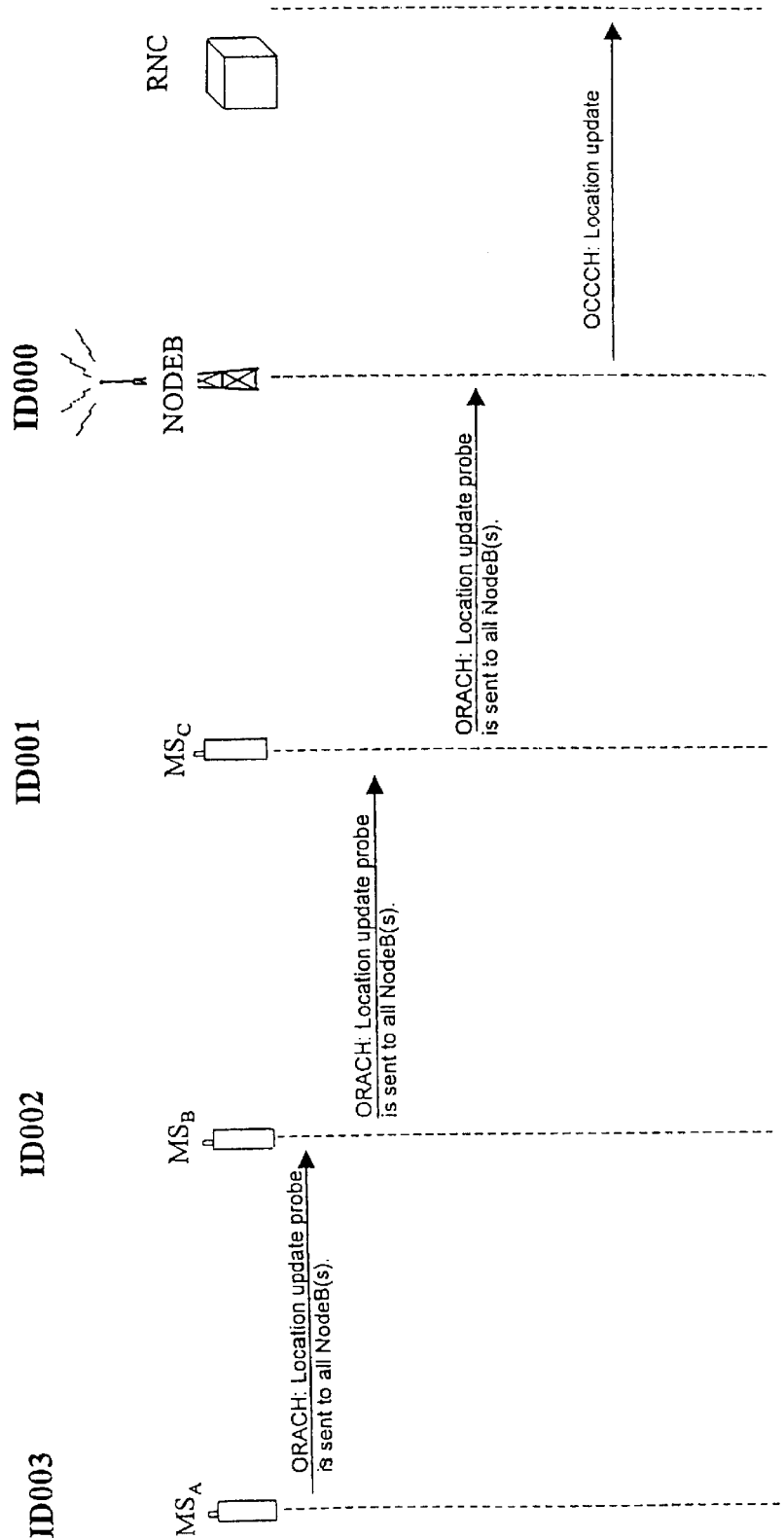

The ODMA location update procedure is required to improve the efficiency of forward-relaylink transmissions to ODMA relay nodes. The location information is stored in the ODMA routing table that is controlled by the RRC in the RNC. The location update procedure is intrinsically half of a standard MO call set-up procedure and is illustrated in FIG. 7.

One of the aims of the present invention is to extend the range of the data service coverage to match that offered by TDD and FDD for speech coverage. A simplistic view of this concept is illustrated in FIG. 8.

In systems where FDD infrastructure may be extensive but limited TDD infrastructure is available then last hop gateway ODMA relay nodes should be deployed. Last Hop Gateway ODMA Relay Nodes provide the ability to extend high data rate communications within 3G systems by interworking ODMA functionality with standard FDD infrastructure requiring only nominal changes to the RNC. Note that this approach is equally applicable to TDD when the NodeB does not have ODMA capability. The mobile station originated and mobile station terminated call set-up procedures with last hop are described in the following subsections.

In a TDD ODMA last hop system the synchronisation information may be obtained from the backbone TDD system. However, when a backbone FDD system is used the synchronisation will have to be derived using a number of methods. One method is just to broadcast TDD synchronisation information over a wide area at a high power. (The range of the synchronisation information is not limited by any round trip delays between the synchronisation transmitter and the relaying mobile stations as it is the difference between the relays that is relevant.) A second method may assume that synchronisation is achieved through a self-synchronisation process executed between ODMA relay nodes. Another alternative is that the ODMA system derives its synchronisation from the standard FDD synchronisation channel. The relative merits of each synchronisation method are FFS.

The communication through ODMA relay nodes is actually simplified with the introduction of Gateway ODMA relay nodes. Assuming that the Gateway ODMA relay nodes are also seeds (deployed and constantly powered) then one could assume that the seeds have been placed in a suitable location to provide good coverage to the NodeB. By extending the opportunistic nature of ODMA in the UTRAN the performance of gateway nodes and NodeB(s) may also be assessed using a probing mechanism.

Assuming that the synchronisation information is received from a beacon TDD transmitter a mobile station originated call set-up procedure with last hop should follow the procedure described below with reference to FIG. 9(a) and FIG. 9(b).

1. $MS_A$ decides to make a call using an ODMA bearer to another mobile station somewhere within the network, which results in a MO call set-up request. [Note: synchronisation is obtained from beacon transmissions.]
2. $MS_A$ sends a call set-up probe to $MS_B$ after consulting its gradient table to determine the best route to a NodeB. The call set-up probe contains details of the required bearer specification.
3. $MS_B$ responds with an acknowledgement probe containing the details of which ODTCH channels may be used for the connection. If an ODTCH is available the ODTCH is used for all further call maintenance communications.
4. The same procedure is executed between $MS_B$–$MS_C$.
5. $MS_C$ is an ODMA gateway relay node and will send the ODMA call set-up information to the NodeB using a transparent FDD packet bearer and will await a response.
6. Once a timeout $T_{routewait}$ has expired the NodeB's gradient table is examined for a suitable gradient to the ODMA node $MS_A$. The NodeB finds that the best gradient is achieved through gateway ODMA relay node $MS_C$.
7. The standard ODMA bearer procedure is carried forward between $MS_C$–$MS_B$ and $MS_B$ to $MS_A$.
8. Once the forward-relaylink channel has been assigned data and further signalling may be carried out over the ODTCH.

In the mobile station terminated call set-up case the last hop the procedure will need to be able to recover a paging message. The paging message can be derived from additional information transmitted with the TDD SCH. However, this may complicate what would be a simply a beacon synchronisation transmitter. An alternative method would be to listen to paging messages using the standard FDD mode but then make any additional communications using a TDD ODMA bearer. A further paging implementation (which has been used in practice) would be to use proxy paging from other ODMA relay nodes.

Figure 10A:
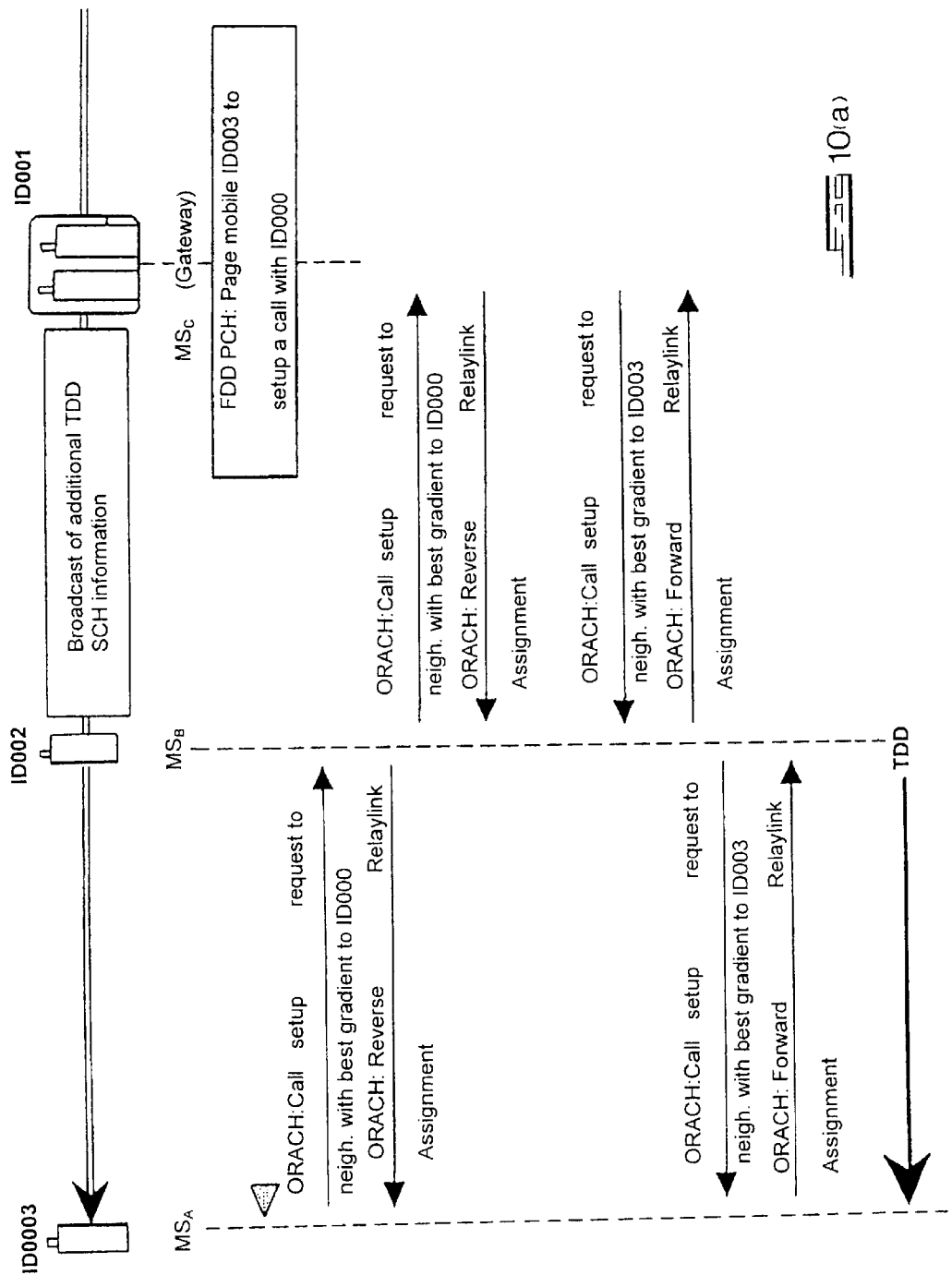

Taking as an example the situation where the paging information is gathered from the current FDD cell transmissions a MT call set-up procedure with last hop is described below with reference to FIG. 10(a) and FIG. 10(b).

1. ID003 is paged [using one of the mechanisms described above] requesting for $MS_A$ to set-up a call with the NodeB using a MO call set-up request.
2. $MS_A$ decides to make a call using an ODMA bearer to another mobile station somewhere within the network resulting in a MO call set-up request. [Note: synchronisation is obtained from beacon transmissions.]
3. $MS_A$ sends a call set-up probe to $MS_B$ after consulting its gradient table to determine the best route to a NodeB. The call set-up probe contains details of the required bearer specification.
4. MSB responds with an acknowledgement probe containing the details of which ODTCH channels may be used for the connection. If an ODTCH is available the ODTCH is used for all further call maintenance communications.
5. The same procedure is executed between $MS_B$–$MS_C$.
6. $MS_C$ is an ODMA gateway relay node and will send the ODMA call set-up information to the NodeB using a transparent FDD packet bearer and will await a response.
7. Once a timeout $T_{routewait}$ has expired the NodeB's gradient table is examined for a suitable gradient to the ODMA node $MS_A$. The NodeB finds that the best gradient is achieved through gateway ODMA relay node $MS_C$.
8. The standard ODMA bearer procedure is carried forward between $MS_C$-$MS_B$ and $MS_B$ to $MS_A$.

Once the forward-relaylink to $MS_A$ has been assigned the ODMA route has been established allowing data and further network system information to be exchanged.

The ODMA location update procedure is required to improve the efficiency of forward-relaylink transmissions to ODMA relay nodes. The location information is stored in the routing table that is controlled by the RRC in the RNC. In the case with a gateway last hop the routing table has to take into account of the first hop to the gateway ODMA relay node. One such location update procedure is shown in FIG. 11(a) and FIG. 11(b).

Set out below is a description relating to the routing of control information in an ODMA relay node.

A key feature of ODMA is the probe mechanism used by $UE_R$s to detect suitable neighbours that may be used as relays during a call. The probe mechanism involves each node transmitting and receiving probe messages on a common control channel, termed the ODMA random access channel (ORACH), and results in the construction of a connectivity table at each node. This table is used to subsequently route data across the network in a dynamic manner without incurring significant overhead.

The ODMA probing mechanism establishes two levels of connectivity within each node: local connectivity and end-to-end connectivity.

Local connectivity enables a node to select a number of local (neighbouring) nodes within a single relay or hop, to exchange broadcast probes.

Broadcast probe messages transmitted on the ORACH will consist of several physical layer characteristics such as TX power, local background noise level and pathloss. Appendix A details the contents of broadcast probe messages. These fields allow a node receiving a broadcast probe message from a neighbouring node to derive a local connectivity indicator for that neighbour. A node maintains a list of local connectivity indicators for each neighbouring node. This neighbours list is included in broadcast probes (see Appendix A), hence, on receiving a broadcast probe with a neighbour list a node can derive local connectivity information for up to two hops away.

Nodes acting as recipients of data (i.e. final destination IDs for data) will also be included in the neighbours lists transmitted in broadcast probes (see Appendix A). In this way nodes are able to derive end-to-end connectivity information for particular destination IDs and include this information in their routing tables.

As described above, ODMA nodes are required to maintain both local and end-to-end connectivity information to efficiently relay data. It is possible to conceptually view this information as being stored in two linked tables as shown in Tables 1 (a) and (b).

The first table details the end-to-end connectivity information in the form of gradients. A gradient is the cumulative cost of transmitting data via a number of relay links to a particular destination. A cost function is used to calculate the gradient for a particular destination. This functions will depend on a number of parameters such as the cumulative power required to reach a destination ID, resource utilisation on relay links, number of relays etc. Each node will update the gradient associated with a particular destination ID every time it receives a probe from a neighbour containing the destination ID. As Table 1(a) shows, one gradient is stored and updated for each neighbour which reports a gradient for the destination ID Each gradient will have an associated timestamp updated every time the gradient is re-calculated which is used to indicate its reliability. Thus if a gradient is not updated it will be degraded through time. Note, the ability to update a gradient is directly related to the probing rate between neighbours.

Local connectivity information will be maintained in a second, linked table (Table 1(b)) which contains data related to a node's neighbours. This data includes the power required to reach a neighbour, the timestamp of the last probe message received from that neighbour and optionally its second tier of neighbours.

TABLE 1

Example of tables that contains routing information (a) End-to-end connectivity table
Gradient to the Destination from the Neighbours

| Destination | Neighbour ID of next hop | | | | | | | |
|---|---|---|---|---|---|---|---|---|
| ID | NID_1 | TS1 | NID_2 | TS2 | — | — | NID_n | TSn |
| DID_1 | $G_{1,1}$ | $T_{1,1}$ | $G_{1,2}$ | $T_{1,2}$ | | | $G_{1,n}$ | $T_{1,n}$ |
| DID_2 | | | | | | | | |
| DID_N | $G_{N,1}$ | | | | | | $G_{N,n}$ | $T_{N,n}$ |

(b) Local connectivity table
Radio Parameters and the Neighbours information

| Neighbour ID → | NID_1 | NID_2 | — NID_n |
|---|---|---|---|
| Transmitting Power | $Tx_1$ | $Tx_2$ | $Tx_n$ |
| TIMESTAMP | $T_1$ | $T_2$ | $T_n$ |
| Neighbours' Tier 1 information | Neighbour list_1 Gradient list_1 | | Neighbour list_n Gradient list_n |

The dimensions of these routing tables (i.e. n and N) will depend on several factors such as required performance characteristics, environment and the distribution or density of relays. It is expected that these dimensions can be tailored to suite the operational requirements of an operator or any implementation constraints.

The following two examples illustrate a possible routing table implementation using a linked-list structure.

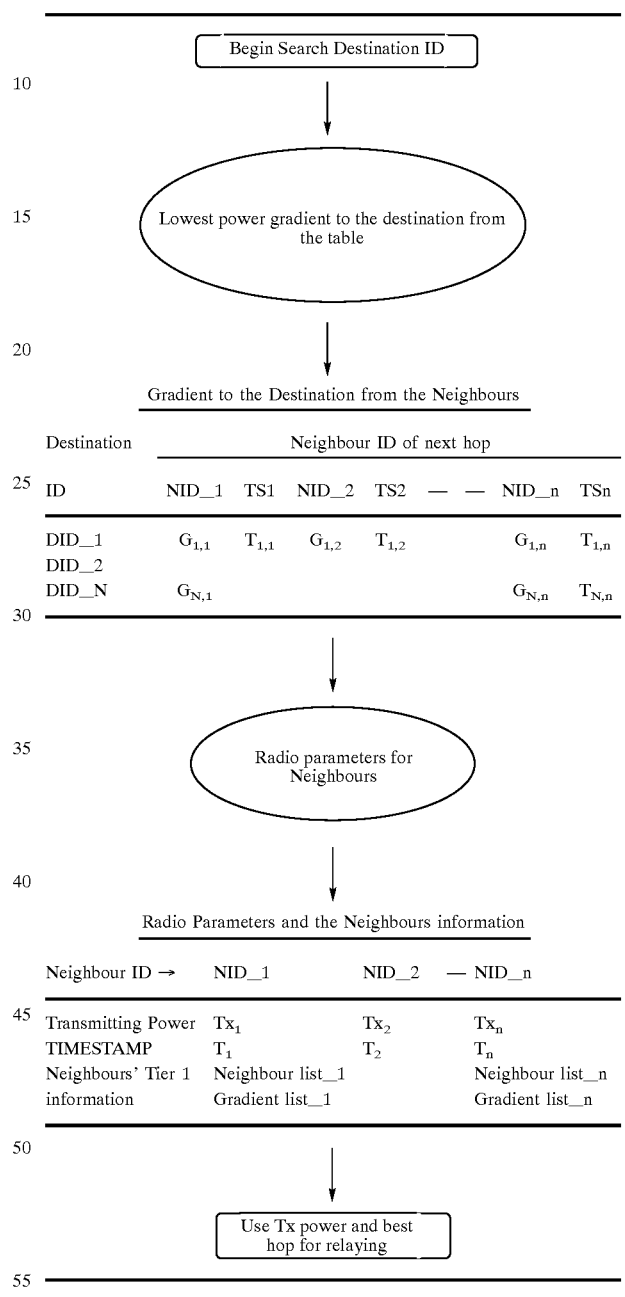

Implementation of Routing Table in the UE

The following diagram illustrates the routing table implementation using linked-list in a RNC.

In the RNC tables will be required to derive ODMA routing through the NodeB's, Sectors, and potentially through Gateway ODMA relay nodes.

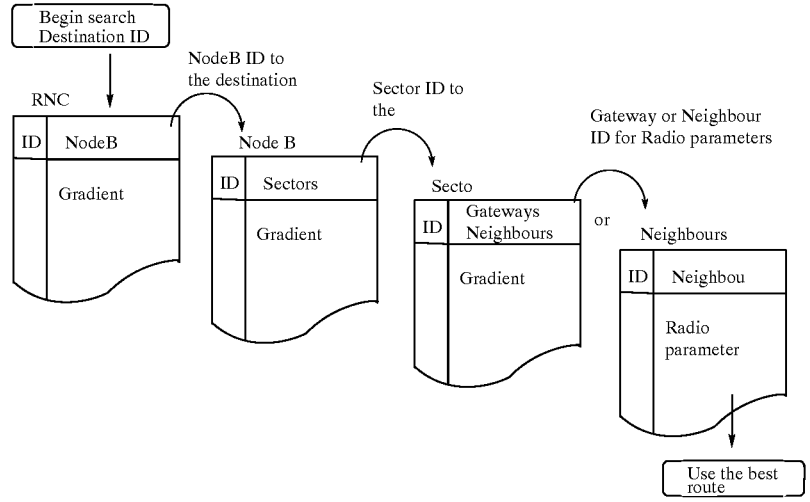

Linked list implementation of routing table in the RNC

Appendix A
Content of Broadcast and Addressed Probe Messages

Two types of probe messages have been defined for ODMA: addressed and broadcast probes. Broadcast messages are transmitted to a collection of local nodes. The transmission power of these messages is chosen such that the minimum signal to noise ratio (SNR) required to successfully receive the message is at least achieved at all nodes. Addressed probes are addressed for particular nodes, hence the transmit power of these messages is chosen such that the minimum SNR required for successful reception is achieved at the intended recipients receiver.

The transmit power required for addressed and broadcast probes is derived from the reception of previous broadcast probes from nodes which (as shown below) indicate the background noise level of the recipients receiver and the transmitted power of these messages.

The format of addressed and broadcast probe messages is similar. The table below shows the contents of probe messages and indicates any differences between the two types described above.

| Field | Length (bytes) | Description |
|---|---|---|
| Sending ID | (*) | ID of transmitting $UE_R$ |
| Receiving ID | (*) | ID of receiving $UE_R$, 0 = broadcast |
| TX power | 1 | TX power of $UE_R$ in dBm |
| Local path loss | 1 | Path loss between transmitting and receiving $UE_R$ (addressed probes only) |
| Background RSSI | 1 | Background RSSI at transmitting $UE_R$ in dBm |
| Requested RX/TX channel | 1 | Requested RF channel number of dedicated TCH |
| Neighbour Routing Flag | 1 | Type of $UE_R$ (used to enhance routing) |
| Neighbour Data List | ID(*) + TX_power_requd (1) + Neigh_flag (1) | List of neighbours with routing data for $UE_R$, where: ID is the ID of neighbouring $UE_R$, TX_power_requd is the combined |

-continued

| Field | Length (bytes) | Description |
|---|---|---|
| | | or direct TX power required to reach neighbouring $UE_R$ and Neigh_flag indicates the type of the neighbouring $UE_R$ i.e. direct neighbour, indirect neighbour or destination ID. |
| Message segments | X | 0, 1 or more message segments, of any type, originated or destined for any ID, which may include user data |

(*)Address field sizes are for further study within 3GPP RAN.

What is claimed is:

1. A method of relaying data between mobile stations in a cellular wireless communication system which comprises a plurality of mobile stations and a plurality of base stations, the method comprising the making of synchronisation transmissions from each base station within an area of coverage of the base station, the synchronisation transmissions defining a broadcast control channel for the transmission of broadcast data from the base station to mobile stations within the area of coverage;

receiving the synchronization transmissions at mobile stations within the area of coverage and extracting data therefrom defining the broadcast control channel, and at least one calling channel on which mobile stations can transmit probe data to one another, the probe data being used by mobile stations to obtain connectivity information relating to the availability of other mobile stations.

2. A method according to claim 1 wherein the broadcast data transmitted from the base station to the mobile stations contains information identifying the base station and information relating to available capacity at the base station.

3. A method according to claim 1 or claim 2 wherein the mobile stations utilize the calling channel to broadcast probe signals to other mobile stations, the probe signals from each mobile station including information on the transmission power, local background noise level and path loss to other stations.

4. A method according to claim 3 wherein mobile stations receiving probe signals from other mobile stations on the calling channel utilize the information therein to generate connectivity data relating to the other mobile stations.

5. A method according to claim 1 or claim 2, wherein the synchronization transmissions define at least one traffic channel usable by mobile stations to relay message data between themselves.

6. A method according to claim 5 wherein the synchronisation transmissions from the base stations are made at relatively high power and a relatively low data rate, and message data transmitted between mobile stations on the traffic channel is transmitted at a relatively low power and a relatively high data rate.

* * * * *